United States Patent [19]
Hubbard

[11] Patent Number: 5,485,927
[45] Date of Patent: Jan. 23, 1996

[54] DRAINING AND DRYING DEVICE FOR UTENSILS

[76] Inventor: Michael W. Hubbard, 41C Manchester St., Lawrence, Mass. 01841

[21] Appl. No.: 205,835

[22] Filed: Mar. 4, 1994

[51] Int. Cl.⁶ ........................................................ A47F 5/00
[52] U.S. Cl. .................................. 211/41; 211/88; 211/99
[58] Field of Search ................................. 211/41, 88, 99, 211/70.7; 248/37.3; D32/55

[56] References Cited

U.S. PATENT DOCUMENTS

| | | | |
|---|---|---|---|
| 1,446,592 | 2/1923 | Smythe | 211/41 X |
| 1,692,003 | 11/1928 | Thayer | 211/41 X |
| 1,733,907 | 10/1929 | Scheuermann | 211/41 X |
| 1,860,617 | 5/1932 | Krause | 211/41 X |
| 3,050,073 | 8/1962 | McMillan | 211/41 X |
| 3,742,965 | 7/1973 | Hudziak | D32/55 X |
| 4,756,582 | 7/1988 | Heien | 211/41 X |
| 5,012,934 | 5/1991 | Newhall | 211/41 |
| 5,119,943 | 6/1992 | Hoang | 211/41 |

*Primary Examiner*—Robert W. Gibson, Jr.
*Attorney, Agent, or Firm*—Lorusso & Loud

[57] ABSTRACT

The present invention provides a new and improved draining and drying device for kitchen utensils hereinafter sometimes referred to as the draining device including a base member having a substantially rectangular bottom wall and four integral perpendicular side walls. The bottom portion of the front wall and the front portion of the bottom wall are provided with opening devices so that water dripped from utensils will flow out of opening devices into the sink, for example. An inner member is provided for insertion into the base member which is formed on all sides and the bottom with rods providing open spaces between each rod. The inner member receives the kitchen materials which have been washed and are inserted to dry. In one embodiment the inner member includes a small rectangular device having multiple small openings for water to drop out which can be used to receive small utensils such as knives, forks, spoons, etc. The portion of the rear wall of the base member is provided with hinge devices to attach the draining device to the kitchen wall and permit the draining device to be rotated up to the wall with latch devices to releasably attach the top of the front wall of the base member. In this manner the draining device of the present invention is releasably secured away from the sink.

10 Claims, 4 Drawing Sheets

DRAINING AND DRYING DEVICE FOR UTENSILS

BACKGROUND OF THE INVENTION

1. Field of the Invention

The present invention relates generally to kitchenware holders for drying purposes and more particularly to a new and improved device for draining and drying kitchenware devices such as dishes, cups, pans, silverware, etc., and which is constructed and arranged for attachment to a wall adjacent to a sink for operation.

2. Description of Prior Art

There are numerous devices in the prior art for dish draining devices.

U.S. Pat. No. 4,756,582 discloses a vertically disposed article support for dishes, glasses, cups and other eating utensils and includes vertically spaced article support portions from which articles to be gravity drained of rinse water and to be air dried may be supported. The lower portion of the article support defines an upwardly opening catch basin or trough for receiving rinse water drained from articles supported from the support and the catch basin includes a gravity drain outlet equipped with a flexible drain tube whereby the article support may be positioned adjacent a kitchen sink and drain water collected thereby directly into the sink, the article support occupying a relatively small counter plan area adjacent the sink.

U.S. Pat. No. 5,109,990 discloses a kitchenware drying rack comprising a central frame which has outwardly extending arms for holding kitchenware mounted on a base adapted to rest on a flat surface adjacent a sink basin and a platform that connects with the base lower end and extends downwardly into the sink basin to stabilize the rack and prevent its tipping.

U.S. Pat. No. 5,012,934 discloses a drainer for drying kitchen and other utensils which has two spaced supports and a horizontally extending shelf for supporting kitchen utensils to be dried. The shelf has longitudinal grooves in its top surface to collect water dripping from kitchen utensils. The top surface of the shelf slopes downwardly lengthwise between a point located intermediate the ends of the shelf and its ends. The longitudinal grooves terminate over a pair of troughs which are provided adjacent to, and below each respective line of intersection of the opposite ends of the shelf and a respective pair of partition walls. The troughs have downwardly inclines bottoms for channeling water to sink. A pair of slits are adjacent the opposite ends of the shelf and the partition walls to establish communication of the top surface of the shelf with the troughs whereby water is steadily and smoothly removed from the shelf without splashing. The drainer is placed over and straddles the rear of the sink and the faucet so as to leave the faucet and space above the sink free.

The foregoing patents as well and the following U.S. patents are believed to exemplify the present state of the art with respect to such kitchenware drying devices:

U.S. Pat. No. 2,852,030
U.S. Pat. No. 2,538,233
U.S. Pat. No. 1,733,907
U.S. Pat. No. 1,037,073

While such prior art devices provide improvement in the areas intended, there still exists a need for a draining and drying device for utensils which overcomes the disadvantages of the prior art devices while providing utility features which provide new and useful advantages and improvements not heretofore disclosed.

Accordingly, a principle desirable object of the present invention is to provide a new and improved draining and drying device which overcomes the disadvantages of the prior art devices.

Another desirable object of the present invention is to provide a kitchenware draining and drying device which is of a compact construction and which is attachable to and operates from a kitchen wall adjacent to the sink.

Another desirable object of the present invention is to provide a kitchenware draining and drying device which when the upper portion is released from the wall to contact the sink, the forward portion contacts only a minimum upper portion of the sink.

Another desirable object of the present invention is to provide a draining and drying device for washed dishes as well as kitchen utensils which includes an inner device for holding the washed dishes and utensils and an outer device for holding the inner device and gravity means for drainage of rinse water preparatory to air drying.

Another desirable object of the present invention is to provide a draining and drying device for washed dishes and utensils which will conform to conventional forms of manufacture, be of simple construction and easy to use so as to provide a device that will be economically feasible, long lasting and relatively trouble free in operation.

These and other desirable objects of the present invention will in part appear hereinafter and will in part become apparent after consideration of the specification with reference to the drawings and the claims.

SUMMARY OF THE INVENTION

The present invention provides a new and improved draining and drying device for kitchen utensils hereinafter sometimes referred to as the draining device. The draining device includes a base member having a substantially rectangular bottom wall and four integral perpendicular side walls. The bottom portion of the front wall and the front portion of the bottom wall are provided with opening devices so that water dripped from utensils will flow out of opening devices into the sink, for example. In addition, an inner member is provided for insertion into the base member with a similar configuration. The inner member is formed on all sides and the bottom with rods providing open spaces between each rod. The inner member receives the kitchen materials which have been washed and are inserted to dry. The inner member also includes a small rectangular device having multiple small openings for water to drop out. This small rectangular device can be used to receive small utensils such as knives, forks, spoons, etc. The portion of the rear wall of the base member is provided with hinge devices to attach the draining device to the kitchen wall and permit the draining device to be rotated up to the wall with latch devices to releasably attach the top of the front wall of the base member. In this manner the draining device of the present invention is releasably secured away from the sink.

BRIEF DESCRIPTION OF THE DRAWINGS

For a fuller understanding of the nature and desired objects of the present invention, reference should be made to the following detailed description taken in conjunction with the accompanying drawings wherein like reference characters denote corresponding parts throughout several views and wherein.

DETAILED DESCRIPTION OF PREFERRED EMBODIMENT(S)

Figure 1:
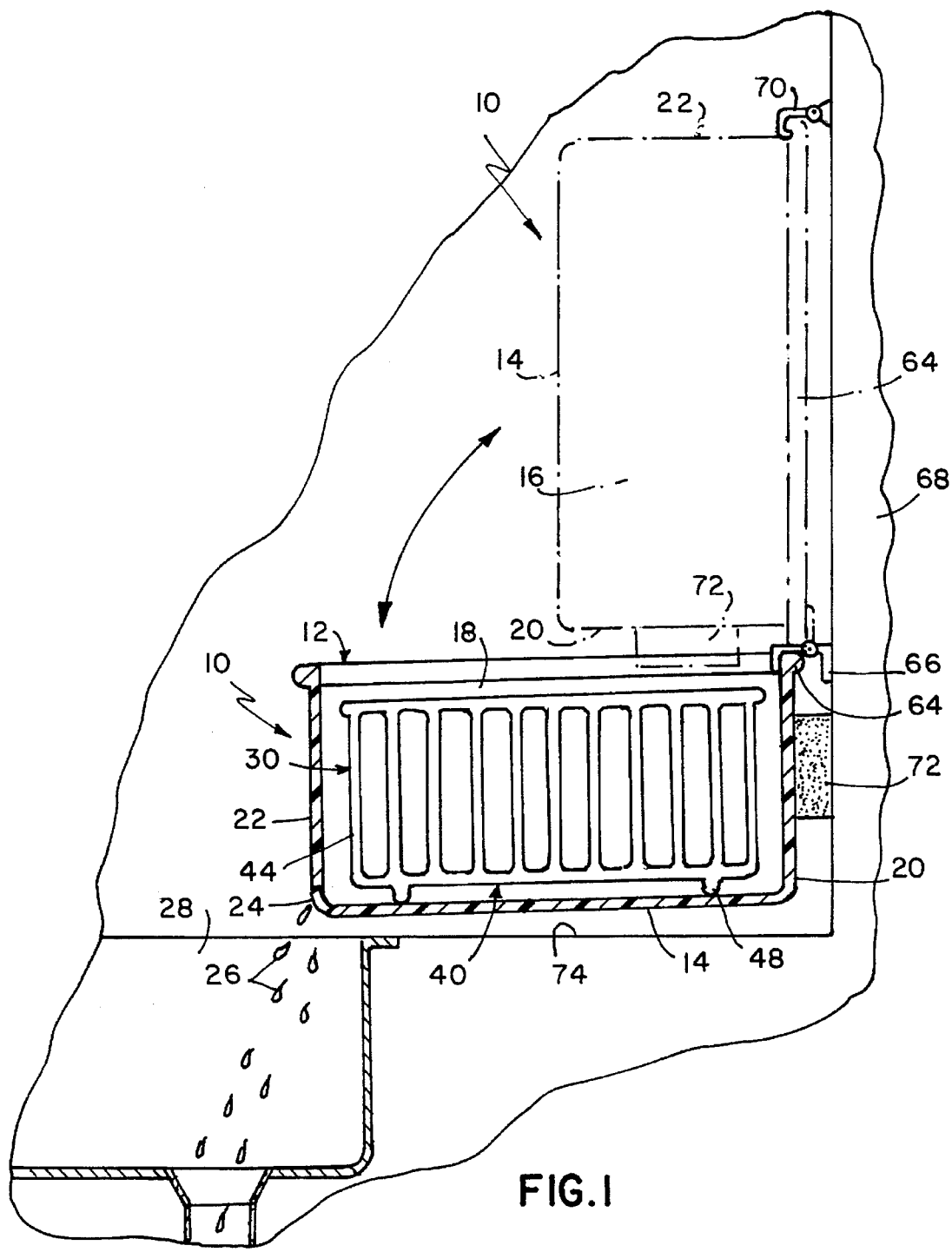
FIG. 1 is a cross-sectional view of the draining and drying device attached to the wall adjacent to the kitchen sink and also illustrating the cross-sectional view of the device in position to be used and in non cross-sectional view attached to the wall when not being used.
Figure 2:
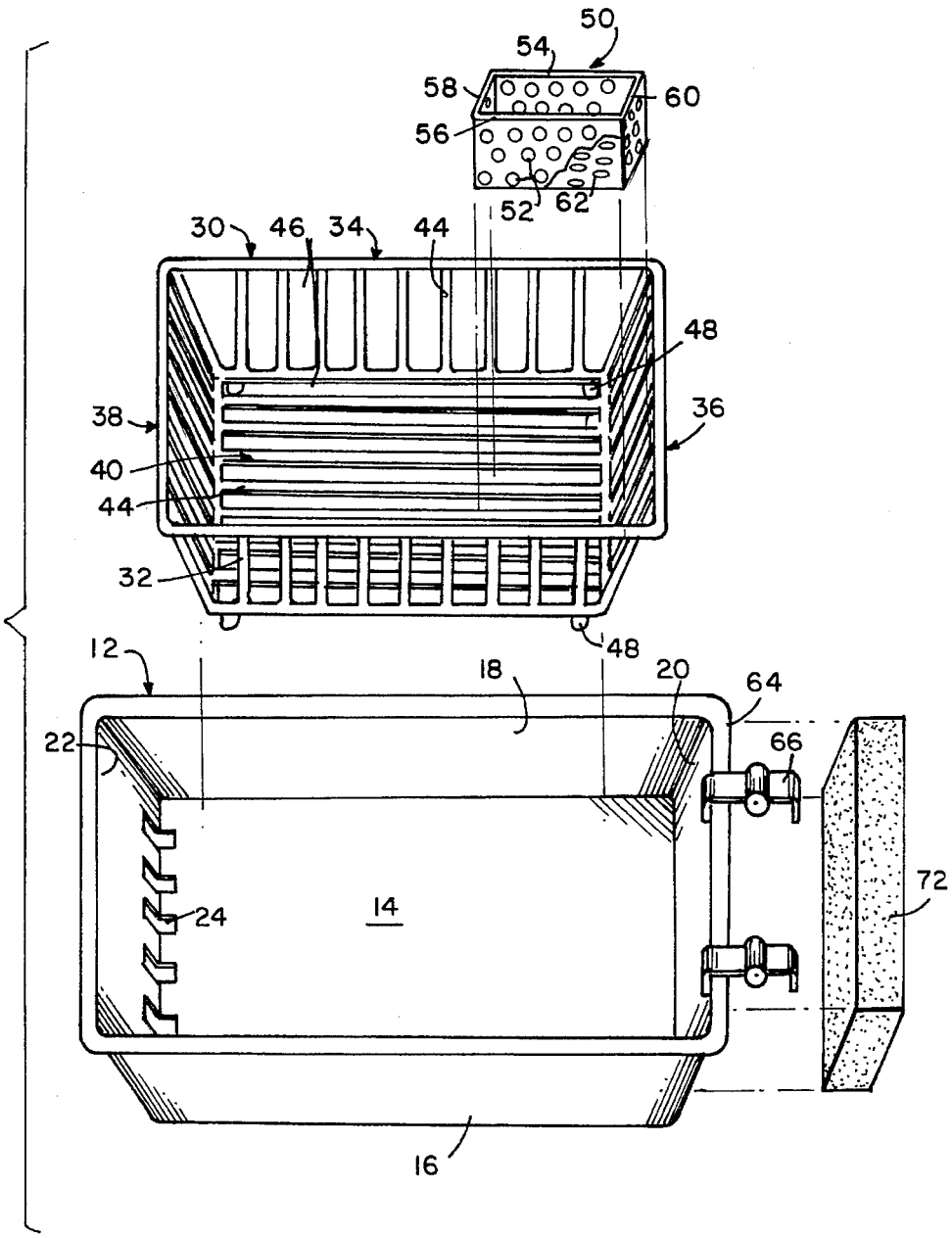
FIG. 2 is an exploded perspective view of the draining and drying device of the present invention.
Figure 3:
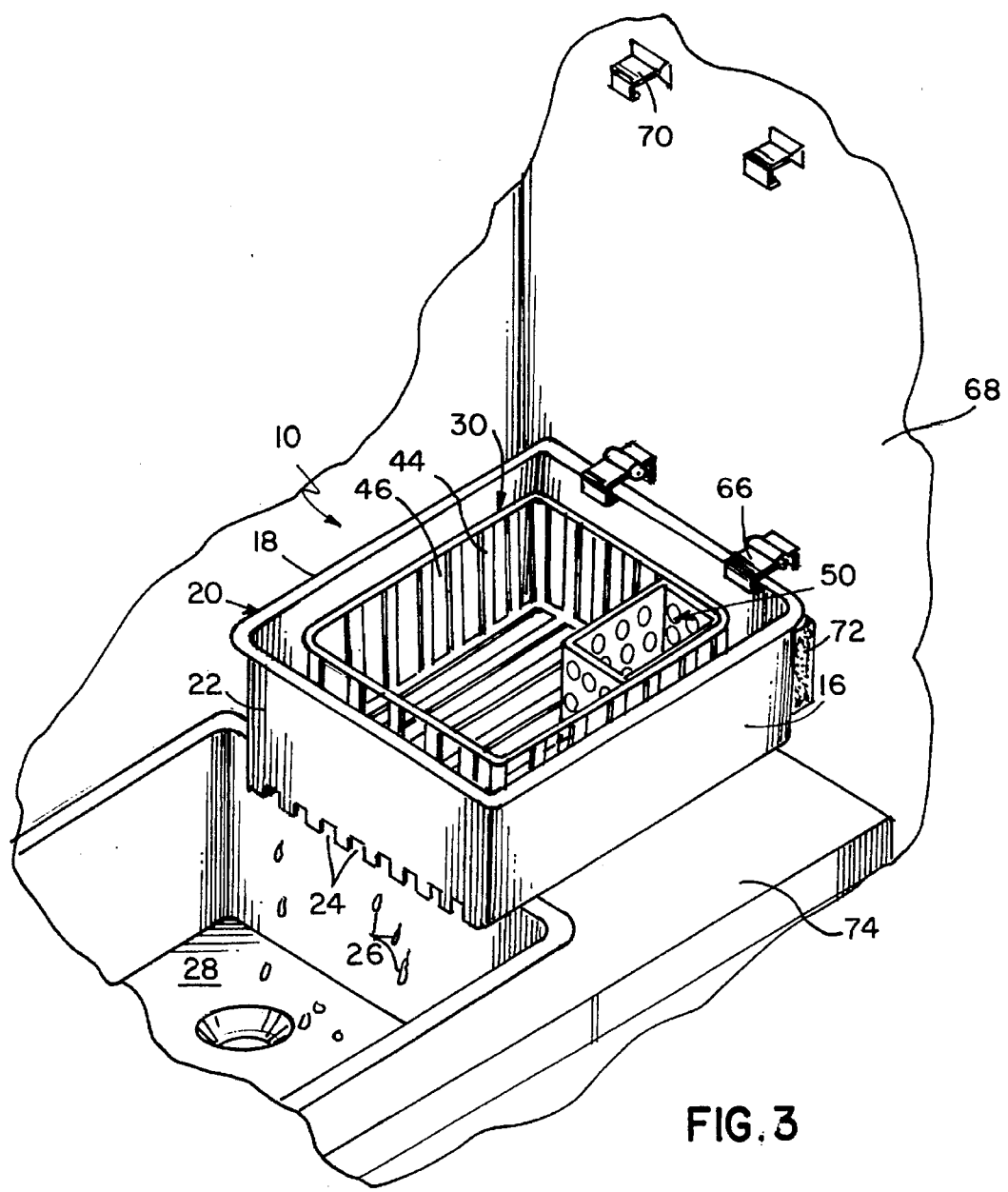
FIG. 3 is a perspective view of the draining and drying device mounted on the kitchen wall with the upper portion released from the wall and the device extended down to the sink for operation.
Figure 4:
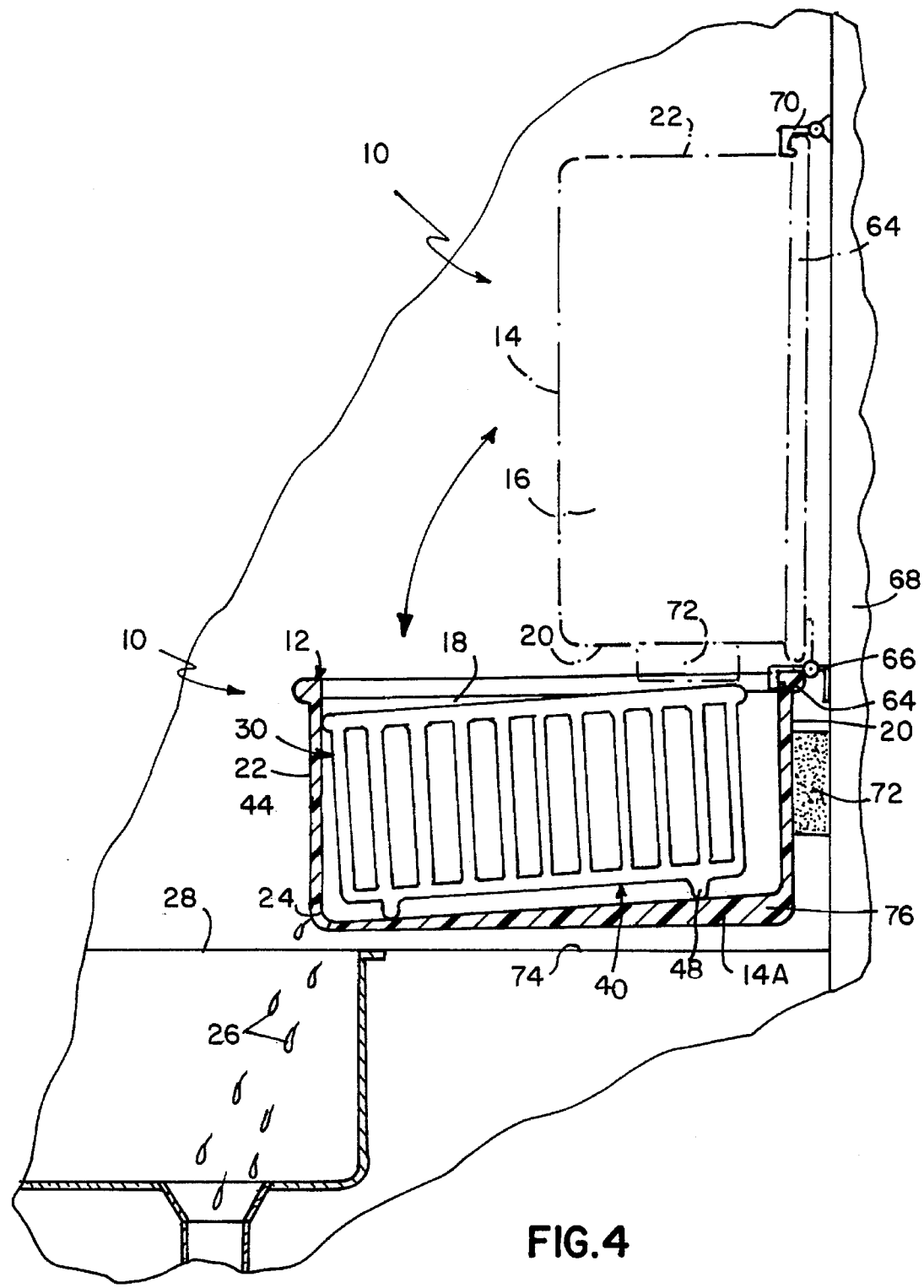
FIG. 4 is a cross-sectional view of an alternate embodiment of the bottom wall of the base member.

Referring now to the drawings, the new and improved draining and drying device for kitchen utensils is illustrated generally by the numeral 10 and is also referred to as the draining device. As best shown in FIG. 2, the draining device 10 includes a base member 12 having a substantially rectangular bottom wall 14, side walls 16 and 18, rear wall 20 and front wall 22 which may also be called panels. The bottom portion of the front wall 22 and the front portion of the bottom wall 14 are provided with opening devices 24 so that water 26 which drips from washed utensils will flow or drip out of the opening device sections 24 into a sink basin 28 as indicated in FIGS. 1, 3 and 4 as examples. The draining device 10 includes an inner member 30. The inner member 30 has a sufficient overall reduced size so that it is insertable into the base member 12. The inner member 30 has side sections 32 and 34, a rear section 36, a front section 38 and a bottom section 40. The inner member device 30 is formed with rod devices 44 which form the side devices 32 and 34, the rear and front devices 36 and 38 and the bottom device 40 are all positioned apart from each other to form openings 46 through which the water on the utensils flows and drips out of the inner device 30 and onto the bottom wall 14 of the base member device 12. The inner member device 30 is preferably provided with bottom foot support devices 48 to support the bottom surface 40 above the bottom wall 16 of the base member 12.

In a preferred embodiment the draining device 10 includes a small rectangular device 50 which has multiple small openings 52 on the longer vertical sides 54 and 56, the shorter sides 58 and 60 and the bottom section 62 so that water dripping from washed devices placed therein will flow out of the openings down through the inner member 30 to the base member 12. This rectangular device 50 is inserted into the inner device 30 so that small utensils such as knives, forks, spoons, etc. will be securely retained so that they do not fall through the openings 46.

The top section 64 of the base member 12 is provided with hinge devices 66 which are attached to the top section 64 of the rear wall 20 and to the kitchen wall 68. As illustrated in FIGS. 1 and 2 the hinge devices 66 permit the draining device 10 to be rotated up to the wall 68 and releasably attach thereto by latch devices 70 while the draining device 10 is not being used. Also in a preferred embodiment the back rear wall 20 of the base member 12 is provided with an attached sponge device 72 which keeps the rear or back wall 20 away from the kitchen wall 68 and also permits the forward portion 22 and the opening device sections 24 to move down slightly close to the sink 28 when the draining device is filled with many washed utensil devices.

FIG. 4 illustrates an alternate embodiment of the bottom wall 14A of the base member 12. As illustrated the bottom wall 14A is constructed to have a higher inner back portion 76 which extends down to a lower inner front portion 78 to the opening devices 24. In this manner the liquid will completely flow to and out of the opening devices 24 when the front portion 22 of the draining device 10 is up slightly higher than the rear portion 20 when attached to a kitchen wall such as 68 or positioned on a sink counter such as 74.

As illustrated in FIGS. 1 and 2 when the draining device 10 is to be used the latch devices 70 are lifted off the top section 64 of the front wall section 22 and moved down so that the bottom wall section 14 extends above the sink counter 74 with the front wall 22 and open devices 24 over the sink 28 so that water 26 drips and flows into the sink 28. When the washed devices are dry they are removed from the draining device 10 which is then moved up and attached to the wall 68 until the next use. In this manner draining device 10 when attached to the wall 68 thereby frees all of the counter space 74 adjacent to the sink 28. While the draining and drying device of the present invention can be made of various materials, preferably the base member 12 and the inner member 30 are formed of various metals or plastics.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

What is claimed is:

1. A drainer device for draining and drying utensils adjacent to a sink basin comprising:

a base means including a bottom wall and perpendicular side, front and side walls;

an inner means insertable into the base means with a similar configuration of the base means for supporting utensils therein;

said base means and inner means having means for channelling water dripping from said utensils to the sink;

means for releasably attaching said base means to a wall adjacent to the sink basis; and wherein said base means further includes a plurality of open sections positioned along the front portion of the bottom wall and the bottom portion of the front wall.

2. The drainer device according to claim 1 wherein said base means includes means for releasably attaching said drainer device to a wall adjacent to the sink basin.

3. The drainer device according to claim 1 further including a small rectangular device inserted into a portion of the inner means; said small rectangular device having four side sections and a bottom section to receive small utensils; and said side and bottom sections having openings for liquid to drip out.

4. A drainer device for draining and drying utensils adjacent to a sink basin comprising:

a base member including a substantially rectangular bottom wall and perpendicular side, front and rear walls;

an inner member insertable into the base member with a similar configuration for supporting utensils therein;

said inner member having openings on all sides and the bottom end for channelling water dripping from said utensils to the base member;

said base member having means for channelling water dripping from said inner member out of said base member; and wherein said base member has a plurality of open sections positioned along the front portion of the bottom wall and the bottom portion of the front wall.

5. The drainer device according to claim 4 wherein said base member includes means for releasably attaching said drainer device to a wall adjacent to the sink basin.

6. The drainer device according to claim 4 wherein said base member includes a bottom wall having a higher inner back portion which extends down to a lower inner front portion adjacent the plurality of open sections positioned along the front portion of the bottom wall and the bottom portion of the front wall.

7. The drainer device according to claim 4 wherein the outer portion of the rear wall of the base member includes a sponge device whereby the rear wall is kept away from the wall adjacent to the sink basin.

8. The drainer device according to claim 4 further including a small rectangular device inserted into a portion of the inner member device; said small rectangular device having four side sections and a bottom section to receive small utensils; and said side and bottom sections having openings for liquid to drip out.

9. A drainer device for draining and drying utensils adjacent to a sink basin comprising:

a base member including a substantially rectangular bottom wall and perpendicular side, front and rear panels forming a top upper open portion;

an inner member insertable into the base member with a similar configuration for supporting utensils therein;

said inner member having openings on all the sides and the bottom end for channelling water dripping from said utensils to the base member;

said base member having means for channelling water dripping from said inner member out of said base member;

a hinge means attached to the outer top section of the rear panel;

said hinge means attachable to a kitchen wall adjacent to a sink basin whereby the draining device is rotatable up to said kitchen wall with the top upper portion adjacent the kitchen wall; and means for releasably attaching the draining device to the kitchen wall while the draining device is not being used.

10. The drainer device according to claim 9 wherein said base member has a plurality of open sections positioned along the front portion of the bottom panel and the bottom portion of the front panel.

* * * * *